US012626874B2

(12) United States Patent
Li

(10) Patent No.: US 12,626,874 B2
(45) Date of Patent: May 12, 2026

(54) PRESS TYPE MECHANICAL SWITCHING MECHANISM AND CIRCUIT BREAKER

(71) Applicant: Wenmei Li, Beijing (CN)

(72) Inventor: Wenmei Li, Beijing (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 285 days.

(21) Appl. No.: 18/521,964

(22) Filed: Nov. 28, 2023

(65) Prior Publication Data

US 2025/0095929 A1 Mar. 20, 2025

(30) Foreign Application Priority Data

Sep. 15, 2023 (CN) ......................... 202311199700.3

(51) Int. Cl.
*H01H 13/30* (2006.01)

(52) U.S. Cl.
CPC .................................. *H01H 13/30* (2013.01)

(58) Field of Classification Search
CPC .......... H01H 13/30; H01H 3/46; H01H 71/04; H01H 71/2463; H01H 71/58; H01H 71/128
See application file for complete search history.

(56) References Cited

U.S. PATENT DOCUMENTS

| | | | | |
|---|---|---|---|---|
| 6,348,847 | B1 | 2/2002 | Nakajima et al. | |
| 2005/0024171 | A1* | 2/2005 | Germain | H01H 3/50 335/18 |
| 2023/0143348 | A1 | 5/2023 | Lu et al. | |

FOREIGN PATENT DOCUMENTS

| | | | | | |
|---|---|---|---|---|---|
| CN | 112768318 | B | | 6/2023 | |
| EP | 0607566 | A1 | * | 7/1994 | H01H 1/20 |
| NL | 8803018 | A | * | 7/1990 | H01H 33/666 |

OTHER PUBLICATIONS

Extended European Search Report dated Apr. 26, 2024 for corresponding European Patent Application No. 1 23212666.4-1201, 7 pages.

* cited by examiner

*Primary Examiner* — Mohamad A Musleh
(74) *Attorney, Agent, or Firm* — Kinney & Lange, P.A.

(57) ABSTRACT

Embodiments of the present disclosure provide a press type mechanical switching mechanism and a circuit breaker. The switching mechanism comprising: a first and a second mechanical contact capable of switching between an on state and an off state; a first pressing member configured to switch the first and second mechanical contacts from the off state to the on state in a case that the first and second mechanical contacts are in the off state and the first pressing member is pressed down; a second pressing member configured to switch the first and second mechanical contacts from the on state to the off state in a case that the first and second mechanical contacts are in the on state and the second pressing member is pressed down; an electromagnetic assembly configured to switch the first and second mechanical contacts from the on state to the off state in a case that the first and second mechanical contacts are in the on state and the first pressing member is not pressed down and in a case that the first and second mechanical contacts are in the on state and the first pressing member is kept pressed down.

15 Claims, 9 Drawing Sheets

PRESS TYPE MECHANICAL SWITCHING MECHANISM AND CIRCUIT BREAKER

FIELD

Embodiments of the present disclosure generally relate to the technical field of electrical equipment, and more particularly, to a press type mechanical switching mechanism and a circuit breaker comprising the press type mechanical switching mechanism.

BACKGROUND

Solid-state circuit breakers require mechanical switching mechanisms, also known as mechanical breakpoint mechanisms, to ensure insulation and isolation requirements. Usually, mechanical switching mechanisms need to have three basic functions, namely manual closing, manual opening, and electric opening. Since the mechanical switching mechanisms in conventional solid-state circuit breakers achieve closing and opening without power, the requirements for contact opening and closing speed and contact pressure do not need to be particularly high.

In some cases, there is a demand for free tripping of the mechanical switching mechanism, that is, the mechanical switching mechanism still maintains the closing action after completing the manual closing, and during this period, it is still hoped that the mechanical switching mechanism can achieve opening operation. Conventional solid-state circuit breakers cannot meet this demand.

SUMMARY

An object of the present disclosure is to provide a press type mechanical switching mechanism and a circuit breaker comprising the press type mechanical switching mechanism to at least partially solve the above problems.

In a first aspect of the present disclosure, there is provided a press type mechanical switching mechanism, comprising: a first mechanical contact and a second mechanical contact capable of switching between an on state and an off state; a first pressing member configured to switch the first mechanical contact and the second mechanical contact from the off state to the on state in a case that the first mechanical contact and the second mechanical contact are in the off state and the first pressing member is pressed down; a second pressing member configured to switch the first mechanical contact and the second mechanical contact from the on state to the off state in a case that the first mechanical contact and the second mechanical contact are in the on state and the second pressing member is pressed down; and an electromagnetic assembly configured to switch the first mechanical contact and the second mechanical contact from the on state to the off state in a case that the first mechanical contact and the second mechanical contact are in the on state and the first pressing member is not pressed down and in a case that the first mechanical contact and the second mechanical contact are in the on state and the first pressing member is kept pressed down.

In some embodiments, the press type mechanical switching mechanism further comprises: a contact support member supporting the first mechanical contact; a transmission member configured to rotate under driving of the first pressing member in a case that the first pressing member is pressed down and drive the contact support member to move, such that the first mechanical contact moves towards the second mechanical contact in a first predefined direction; and a position limiting member configured to lock the contact support member in a case that the first mechanical contact and the second mechanical contact are in the on state, and unlock the contact support member in a case that the second pressing member is pressed down or the electromagnetic assembly is triggered.

In some embodiments, the first pressing member comprises a first pressing part and a rotating part rotatably connected to the first pressing part, wherein before the first pressing part is pressed to a first predefined position with respect to the rack, the rotating part is capable of moving together with the first pressing part in a pressing direction with respect to the rack to drive the transmission member to rotate, and after the first pressing part is pressed to the first predefined position with respect to the rack, the rotating part is capable of rotating with respect to the first pressing part and stop driving the transmission member to rotate.

In some embodiments, the first pressing part is connected to the rack via an elastic member and is limited by the rack in an initial position without being pressed.

In some embodiments, the transmission member comprises a first transmission part and a second transmission part, the first transmission part is actively connected to the first pressing member and capable of rotating under driving of the first pressing member, the second transmission part is configured to drive the contact support member to move under driving of the first transmission part such that the first mechanical contact moves towards the second mechanical contact in the first predefined direction.

In some embodiments, the contact support member comprises: a sliding member capable of moving with respect to the rack in the first predefined direction in a case that the first pressing member is pressed down; a support part connected to the sliding member and supporting the first mechanical contact; a third transmission part connected to the sliding member and capable of being driven by the transmission member such that the sliding member moves in the first predefined direction with respect to the rack; and a first mating part connected to the sliding member and capable of being locked by the position limiting member.

In some embodiments, the sliding member is connected to the rack via an elastic member and capable of pulling the sliding member towards a direction opposite to the first predefined direction in a case that the position limiting member unlocks the contact support member.

In some embodiments, the contact support member further comprises: an indicating part connected to the sliding member and capable of indicating a connection state between the first mechanical contact and the second mechanical contact.

In some embodiments, the position limiting member is rotatably connected to the rack and comprises a fourth transmission part and a second mating part, the fourth transmission part is capable of being driven by the second pressing member or the electromagnetic assembly to cause the position limiting member to rotate in a second predefined direction with respect to the rack, wherein the second mating part locks the contact support member before the position limiting member rotates to a second predefined position in the second predefined direction with respect to the rack, and the second mating part unlocks the contact support member after the position limiting member rotates to the second predefined position in the second predefined direction with respect to the rack.

In some embodiments, the position limiting member is provided with a torsional spring, and in a case that the second pressing member is released or the electromagnetic assembly is not triggered, the torsional spring drives the position limiting member to rotate in a direction opposite to the second predefined direction.

In some embodiments, the electromagnetic assembly comprises an iron core, wherein in a case that the electromagnetic assembly is triggered, the iron core extends out and is capable of driving the position limiting member to unlock the contact support member.

In some embodiments, the second pressing member is connected to the rack via an elastic member and is limited in an initial position by the rack without being pressed.

In some embodiments, the second mechanical contact is connected to the rack via an elastic member.

In some embodiments, the first mechanical contact is connected to the contact support member via an elastic member.

In a second aspect of the present disclosure, there is provided a solid-state circuit breaker comprising a press type mechanical switching mechanism of the first aspect of the present disclosure.

According to embodiments of the present disclosure, switching between two stable states including the on state and the off state of the first mechanical contact and the second mechanical contact can be achieved only by simple pressing actions. In addition, the mechanical switching mechanism of embodiments of the present disclosure can achieve the free tripping of the circuit breaker, that is, even after the mechanical switching mechanism completes manual closing and maintains the closing action, the opening operation can still be realized, so that the circuit breaker can be freely tripped.

It should be understood that the content described in this section is not intended to define critical or important features of the embodiments of the present disclosure, nor is it used to limit the scope of the present disclosure. Other features of the present disclosure will become easier to be understood through the following description.

BRIEF DESCRIPTION OF THE DRAWINGS

The above and other features, advantages, and aspects of each embodiment of the present disclosure will become more apparent in conjunction with the accompanying drawings and with reference to the following detailed explanations. In the accompanying drawings, the same or similar reference symbols represent the same or similar elements, where.

REFERENCE SYMBOLS

101-106, 201-203 blocks;
10 a rack;
21 a first pressing member;
211 a first pressing part;
212 a rotating part;
22 a second pressing member;
30 a transmission member;
301 a first transmission part;
302 a second transmission part;
40 a contact support member;
401 a sliding part;
402 a support part;
403 a third transmission part;
404 a first mating part;
405 an indicating part;
50 a position limit member;
501 a fourth transmission part;
502 a second mating part;
60 an electromagnetic assembly;
601 an iron core;
71 a compression spring;
72 a tension springs;
73 a torsional springs;
81 a first mechanical contact;
82 a second mechanical contact.

DETAILED DESCRIPTION

Preferred embodiments of the present disclosure will be described in more detail below with reference to the accompanying drawings. Although the preferred embodiments of the present disclosure are shown in the accompanying drawings, it is to be understood that the present disclosure may be implemented in various forms and should not be limited by the embodiments described here. On the contrary, these embodiments are provided to make the present disclosure more thorough and complete, and to fully convey the scope of the present disclosure to those skilled in the art.

The term "comprise" and its variants used herein indicate open inclusion, that is, "including but not limited to". Unless otherwise stated, the term "or" should be interpreted as "and/or". The term "based on" should be interpreted as "based at least in part on". The terms "an exemplary embodiment" and "an embodiment" should be interpreted as "at least one exemplary embodiment". The term "another embodiment" should be interpreted as "at least one other embodiment". The terms "first", "second", and so on may refer to different or identical objects.

Figure 1:
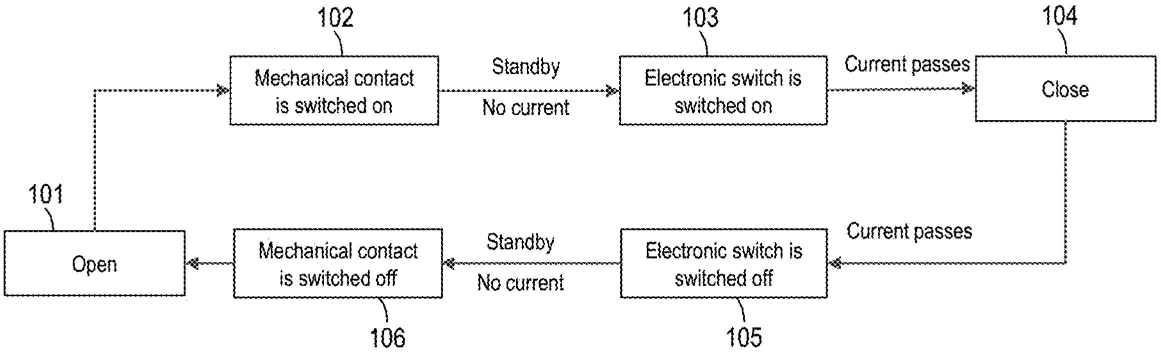
FIG. 1 shows an operation flowchart of turning on and off a main loop by a conventional solid-state circuit breaker.

FIG. 1 shows an operation flowchart of turning on and off a main loop by a conventional solid-state circuit breaker. As shown in FIG. 1, at block 101, the solid-state circuit breaker is in the opened state. At block 102, a mechanical contact of the solid-state circuit breaker is switched on, so that the solid-state circuit breaker is in a standby state, and no current flows through the solid-state circuit breaker at this time. At block 103, an electronic switch of the solid-state circuit breaker is switched on, so that there is current flowing through the solid-state circuit breaker. At block 104, the solid-state circuit breaker is in the closed state with both the mechanical contact and the electronic switch switched on. At block 105, the electronic switch is switched off, so that the solid-state circuit breaker is in the standby state, and no current flows through the solid-state circuit breaker at this time. At block 106, the mechanical contact is switched off. In a case that both the mechanical contact and the electronic switch are switched off, the solid-state circuit breaker is in the off state. Since the mechanical switching mechanisms in conventional solid-state circuit breakers realize closing and opening without power, the requirements for contact opening and closing speed and contact pressure do not need to be particularly high.

In some cases, there is a demand for free tripping of the mechanical switching mechanism, that is, the mechanical switching mechanism still maintains the closing action after completing the manual closing, and during this period, it is still hoped that the mechanical switching mechanism can realize opening operation. The conventional solid-state circuit breaker cannot meet this demand. Embodiments of the present disclosure provide a press type mechanical switching mechanism (also referred to as a press type mechanical breakpoint mechanism herein), which can switch between the two stable states, i.e., an on state and an off state, and can achieve free tripping of the circuit breaker. Embodiments of the present disclosure will be described below in conjunction with FIGS. 2 to 8E.

Figure 2:
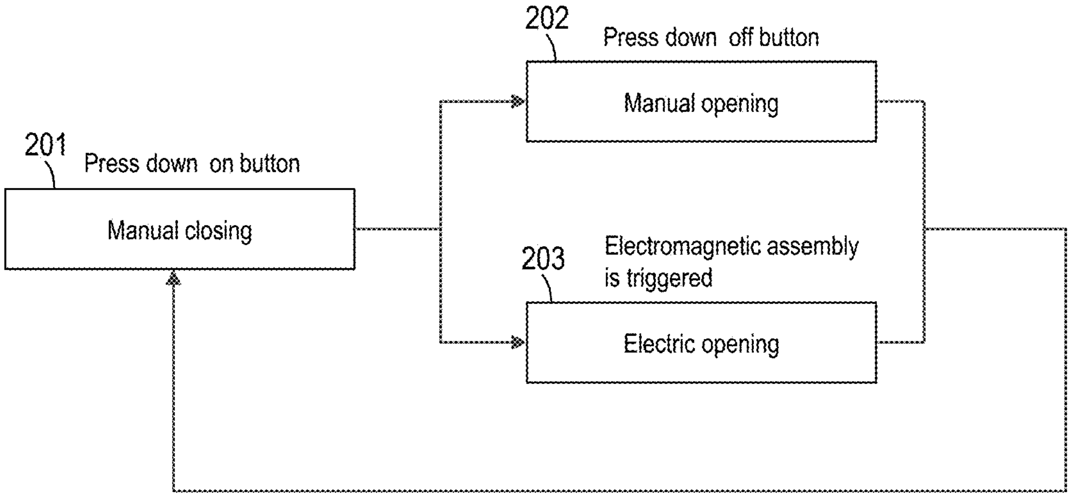
FIG. 2 shows an operation flowchart of a press type mechanical switching mechanism according to an embodiment of the present disclosure.

FIG. 2 shows an operation flowchart of the press type mechanical switching mechanism according to an embodiment of the present disclosure. As shown in FIG. 2, at block 201, a first pressing member (e.g., an on button) is pressed down to manually close the press type mechanical switching mechanism. At block 202, a second pressing member (e.g., an off button) is pressed down to manually open the press type mechanical switching mechanism. At block 203, an electromagnetic assembly is triggered by power, thereby realizing the electric opening of the press type mechanical switching mechanism. In the embodiments of the present disclosure, in a case that the first pressing member is pressed down, the triggering of the electromagnetic assembly may also open the press type mechanical switching mechanism, thereby achieving the free tripping.

Figure 3:
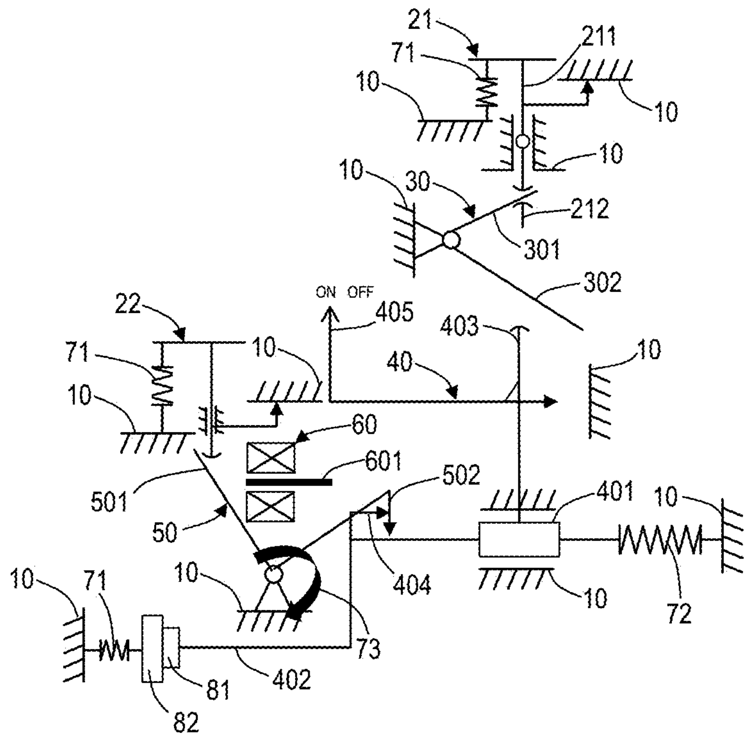
FIG. 3 shows a schematic structural diagram of the press type mechanical switching mechanism in a closed state according to an embodiment of the present disclosure.
Figure 4:
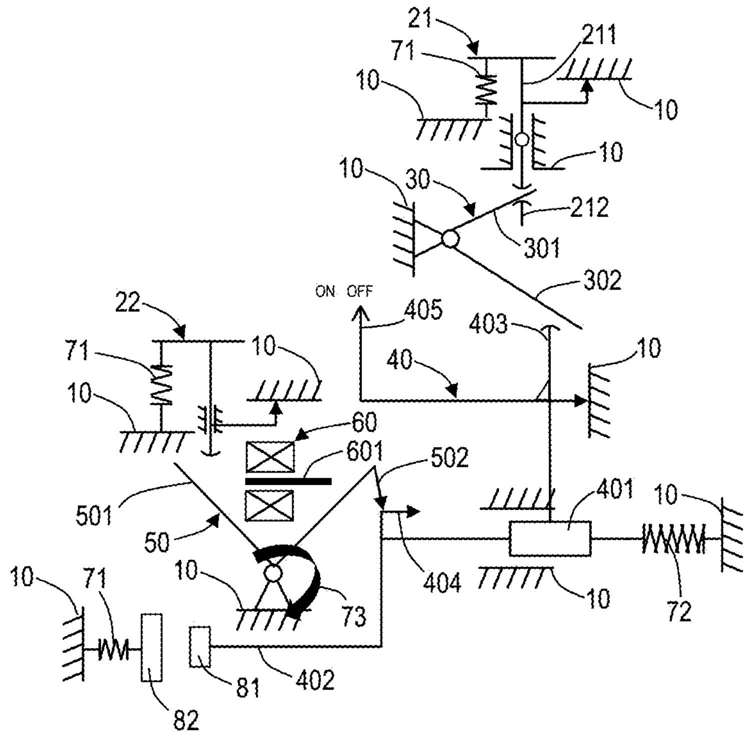
FIG. 4 shows a schematic structural diagram of the press type mechanical switching mechanism in an opened state according to an embodiment of the present disclosure.

FIG. 3 shows a schematic structural diagram of the press type mechanical switching mechanism in the closed state according to an embodiment of the present disclosure. FIG. 4 shows a schematic structural diagram of the press type mechanical switching mechanism shown in FIG. 3 in the opened state.

In an embodiment, as shown in FIGS. 3 and 4, the press type mechanical switching mechanism described herein generally includes a rack 10, a first pressing member 21, a second pressing member 22, a transmission member 30, a contact support member 40, a position limiting member 50, an electromagnetic assembly 60, a first mechanical contact 81 and a second mechanical contact 82.

The rack 10 mainly plays a supporting role for supporting at least a portion of other components in the press type mechanical switching mechanism. For example, one or more of the first pressing member 21, the second pressing member 22, the transmission member 30, the contact support member 40, the position limiting member 50, the electromagnetic assembly 60, the first mechanical contact 81 and the second mechanical contact 82 may be directly connected to the rack 10 or connected to the rack 10 via one or more intermediate connectors.

The first pressing member 21 is used to realize the manual closing operation of the press type mechanical switching mechanism. In a case that the press type mechanical switching mechanism is in the opened state, by pressing the first pressing member 21, the press type mechanical switching mechanism can be switched to the closed state.

The second pressing member 22 is used to realize the manual opening operation of the press type mechanical switching mechanism. In a case that the press type mechanical switching mechanism is in the closed state, by pressing the second pressing member 22, the press type mechanical switching mechanism can be switched to the opened state. The opened state and the closed state are two stable states of the press type mechanical switching mechanism. The press type mechanical switching mechanism will be in one of the opened state and the closed state under stable conditions.

In a case that the first pressing member 21 is pressed, the transmission member 30 can move with respect to the rack 10 under driving of the first pressing member 21, and drive the contact support member 40 to move with respect to the rack 10 along a first predefined direction (e.g., leftwards in the figures).

The contact support member 40 is used to support the first mechanical contact 81, and can move with respect to the rack 10 along the first predefined direction (e.g., leftwards in the figures) and a direction opposite to the first predefined direction (e.g., rightwards in the figures), so that the first mechanical contact 81 and the second mechanical contact 82 is switched on or off. The first mechanical contact 81 may also be referred to as a moving contact herein, the second mechanical contact 82 may also be referred to as a fixed contact herein.

The position limiting member 50 is used to lock the contact support member 40 in a case that the first mechanical contact 81 and the second mechanical contact 82 are in the on state, to prevent the contact support member 40 from moving with respect to the rack 10, so that the first mechanical contact 81 and the second mechanical contact 82 are held in the on state.

The electromagnetic assembly 60 is used to realize the electric opening operation of the press type mechanical switching mechanism. When the press type mechanical switching mechanism is in the closed state and the first pressing member 21 is not pressed down, by powering the electromagnetic assembly 60, the electromagnetic assembly 60 can drive the position limiting member 50 to move to unlock the contact support member 40, so that the first mechanical contact 81 is separated from the second mechanical contact 82, and the press type mechanical switching mechanism is switched to the opened state. In addition, in a case that the press type mechanical switching mechanism is in the closed state and the first pressing member 21 is kept pressed down, by powering the electromagnetic assembly 60, the electromagnetic assembly 60 can also drive the position limiting member 50 to move to unlock the contact support member 40, so that the first mechanical contact 81 is separated from the second mechanical contact 82, achieving the free tripping of the solid-state circuit breaker.

In some embodiments, as shown in FIGS. 3 and 4, the first pressing member 21 includes a first pressing part 211 and a rotating part 212. The rotating part 212 can be rotatably connected to the first pressing part 211 via a hinge or any suitable connecting structure. The first pressing part 211 can be connected to the rack 10 via a compression spring 71.

In a case that the first pressing part 211 is pressed, the compression spring 71 can be compressed and shortened. Before the first pressing part 211 is pressed to a predefined position with respect to the rack 10, the rotating part 212 will be limited by the rack 10 and will move with respect to the rack 10 together with the first pressing part 211, without rotating with respect to the first pressing part 211. In this case, the rotating part 212 can drive the transmission member 30 to move with respect to the rack 10. After the first pressing part 211 is pressed to the predefined position with respect to the rack 10, the rotating part 212 is no longer limited by the rack 10, so the rotating part 212 will rotate with respect to the first pressing part 211 and bend.

In a case that the first pressing part 211 is released (i.e., not pressed), the compression spring 71 may be restored to an elongated state, and the rack 10 may prevent movement of the first pressing part 211, so that the first pressing part 211 is held in an initial position at which the first pressing part 211 is not pressed.

In some embodiments, the first pressing part 211 may also be connected to the rack 10 via a tension spring. In such embodiments, in a case that the first pressing part 211 is pressed, the tension spring may be stretched and elongated. In a case that the first pressing part 211 is released (i.e., not pressed), the tension spring may be restored to its initial state. In this way, the pressing operation of the first pressing part 211 can also be realized in a simple manner.

In some embodiments, as shown in FIGS. 3 and 4, the transmission member 30 may be rotatably connected to the rack 10 via a hinge or any suitable connecting structure. In a case that the first pressing member 21 is pressed down, the transmission member 30 may rotate with respect to the rack 10 under driving of the first pressing member 21, and drive the contact support member 40 to move with respect to the rack 10.

In some embodiments, as shown in FIGS. 3 and 4, the transmission member 30 includes a first transmission part 301 and a second transmission part 302. The first transmission part 301 can be actively connected to the first pressing member 21, for example, connected to the rotating part 212. During the process of the first pressing member 21 being pressed with respect to the rack 10, the first pressing member 21 can generate a force on the first transmission part 301, thereby driving the transmission member 30 to rotate with respect to the rack 10. At this time, the second transmission part 302 can drive the contact support member 40 to move with respect to the rack 10 under driving of the first transmission part 301.

In some embodiments, as shown in FIGS. 3 and 4, in a case that the first pressing member 21 is not pressed, the second transmission part 302 may be separated from the contact support member 40. In some embodiments, in a case that the first pressing member 21 is not pressed, the second transmission part 302 may be in contact with the contact support member 40 to some extent, embodiments of the present disclosure is not limited in this respect.

In some embodiments, as shown in FIGS. 3 and 4, the contact support member 40 includes a sliding member 401, a support part 402, a third transmission part 403, and a first mating part 404. The sliding member 401 is movable with respect to the rack 10 in a predefined direction (e.g., leftwards or rightwards). The support part 402 is connected to the sliding member 401 so as to support the first mechanical contact 81. In a case that the sliding member 401 slides with respect to the rack 10 in a predefined direction, the support part 402 can drive the first mechanical contact 81 close to or away from the second mechanical contact 82, so that the two contacts are switched on or off. The third transmission part 403 is connected to the sliding member 401 and is arranged in correspondence to the second transmission part 302. The first mating part 404 is connected to the sliding member 401 and can mate with the position limiting member 50 to achieve locking on the contact support member 40 by the position limiting member 50.

During the process of the first pressing member 21 being pressed with respect to the rack 10, the transmission member 30 can rotate with respect to the rack 10, so that the second transmission part 302 applies a force to the third transmission part 403, thereby driving the sliding member 401 to move leftwards. In this way, the first mechanical contact 81 can be made in contact with the second mechanical contact 82.

The sliding member 401 is also connected to the rack 10 via a tension spring 72. In a case that the first pressing member 21 is not pressed and the position limiting member 50 unlocks the contact support member 40, the tension spring 72 may pull the sliding member 401, such that the first mechanical contact 81 moves rightwards along a direction away from the second mechanical contact 82, thereby separating the first mechanical contact 81 from the second mechanical contact 82. In some embodiments, the rack 10 may limit the movement range of the contact support member 40 in a direction away from the second mechanical contact 82.

In some embodiments, the sliding member 401 may also be connected to the rack via a compression spring. For example, the compression spring is provided on the left side of the sliding member 401. In a case that the first pressing member 21 is not pressed and the position limiting member 50 unlocks the contact support member 40, the compression spring can push the sliding member 401 so that the first mechanical contact 81 moves rightwards in a direction away from the second mechanical contact 82, thereby separating the first mechanical contact 81 from the second mechanical contact 82.

In some embodiments, as shown in FIGS. 3 and 4, the contact support member 40 further includes an indicating part 405. The indicating part 405 can indicate the state of the press type mechanical switching mechanism. Specifically, the indicating part 405 can indicate the connection state between the first mechanical contact 81 and the second mechanical contact 82. As shown in FIG. 3, when the first mechanical contact 81 contacts the second mechanical contact 82, the indicating part 405 can indicate that the two contacts are in the ON state. As shown in FIG. 4, when the first mechanical contact 81 is separated from the second mechanical contact 82, the indicating part 405 can indicate that the two contacts are in the OFF state.

In an embodiment, as shown in FIGS. 3 and 4, the second mechanical contact 82 is connected to the rack 10 via a compression spring 71. In a case that the first mechanical contact 81 and the second mechanical contact 82 are in the on state, the compression spring 71 is compressed and shortened, thereby increasing the contact force between the two contacts, so that the contact is more stable and reliable.

In some embodiments, the second mechanical contact 82 is also connected to the rack 10 via a tension spring. For example, the tension spring can be arranged on the right side of the second mechanical contact 82. In a case that the first mechanical contact 81 and the second mechanical contact 82 are in the on state, the tension spring is stretched and elongated, and the contact force between the two contacts can also be increased, so that the contact is more stable and reliable.

In some embodiments, the first mechanical contact 81 may be connected to the contact support member 40 via an elastic member. The elastic member may be a compression spring or a tension spring. With such an arrangement, it is also able to increase the contact force between the two contacts, so that the contact is more stable and reliable.

The second pressing member 22 is used to implement the manual opening operation of the press type mechanical switching mechanism. In a case that the second pressing member 22 is pressed down, the second pressing member 22 can drive the position limiting member 50 to rotate with respect to the rack 10, thereby unlocking the contact support member 40.

In an embodiment, as shown in FIGS. 3 and 4, the second pressing member 22 may be connected to the rack 10 via a compression spring 71. In a case that the second pressing member 22 is pressed down, the compression spring 71 may be compressed and shortened. In a case that the second pressing member 22 is released (i.e., not pressed), the compression spring 71 may be restored to the elongated state, and the rack 10 may limit the movement range of the second pressing member 22, so that the second pressing member 22 is held in the initial position at which the second pressing member 22 is not pressed.

In some embodiments, the second pressing member 22 may also be connected to the rack 10 via a tension spring. In such embodiments, in a case that the second pressing member 22 is pressed, the tension spring may be stretched and elongated. In a case that the second pressing member 22 is released (i.e., not pressed), the tension spring may be restored to its initial state. In this manner, the pressing operation on the second pressing member 22 can also be achieved.

In an embodiment, as shown in FIGS. 3 and 4, the electromagnetic assembly 60 may include an iron core 601. In a case that the electromagnetic assembly 60 is triggered, the iron core 601 may extend, thereby driving the position limiting member 50 to rotate with respect to the rack 10 to unlock the contact support member 40.

In an embodiment, as shown in FIGS. 3 and 4, the position limiting member 50 may be rotatably connected to the rack 10 via a hinge or any suitable connecting structure. In a case that the second pressing member 22 is pressed down or the electromagnetic assembly 60 is triggered, the position limiting member 50 may rotate with respect to the rack 10 in a second predefined direction (e.g., counterclockwise direction in the figures) under driving of the second pressing member 22 or under driving of the electronic component 60, thereby unlocking the contact support member 40.

In an embodiment, as shown in FIGS. 3 and 4, the position limiting member 50 includes a fourth transmission part 501 and a second mating part 502. In a case that the second pressing member 22 is pressed down, the second pressing member 22 can generate a force on the fourth transmission part 501, thereby driving the position limiting member 50 to rotate with respect to the rack 10, for example, in the counterclockwise direction as shown in the figure. Similarly, in a case that the electromagnetic assembly 60 is triggered, the iron core 601 of the electromagnetic assembly 60 can extend, thereby generating a force on the fourth transmission part 501, driving the position limiting member 50 to rotate with respect to the rack 10, for example, in the counterclockwise direction as shown in the figure. The second mating part 502 is used to mate with the contact support member 40 to lock the contact support member 40 in a case that the first mechanical contact 81 and the second mechanical contact 82 are in the on state.

In an embodiment, as shown in FIGS. 3 and 4, the position limiting member 50 is provided with a torsional spring 73. In a case that the second pressing member 22 is released or the iron core 601 of the electromagnetic assembly 60 is retracted, the torsional spring 73 may drive the position limiting member 50 to rotate with respect to the rack 10, for example, in a clockwise direction as shown in the figures. In the process of the first pressing member 21 being pressed, the movement of the contact support member 40 to the left can drive the position limiting member 50 to rotate in a counterclockwise direction as shown in the figures. In a case that the first pressing member 21 is released, the torsional spring 73 may drive the position limiting member 50 to rotate with respect to the rack 10, for example, in a clockwise direction as shown in the figures to a position at which the position limiting member 50 locks the contact support member 40.

Next, the manual closing, the manual opening, the electric opening and the free tripping process of the press type mechanical switching mechanism will be described in conjunction with FIGS. 5A to 8E.

FIGS. 5A to 5D illustrate a manual closing process of the press type mechanical switching mechanism according to an embodiment of the present disclosure.

Figure 5A:
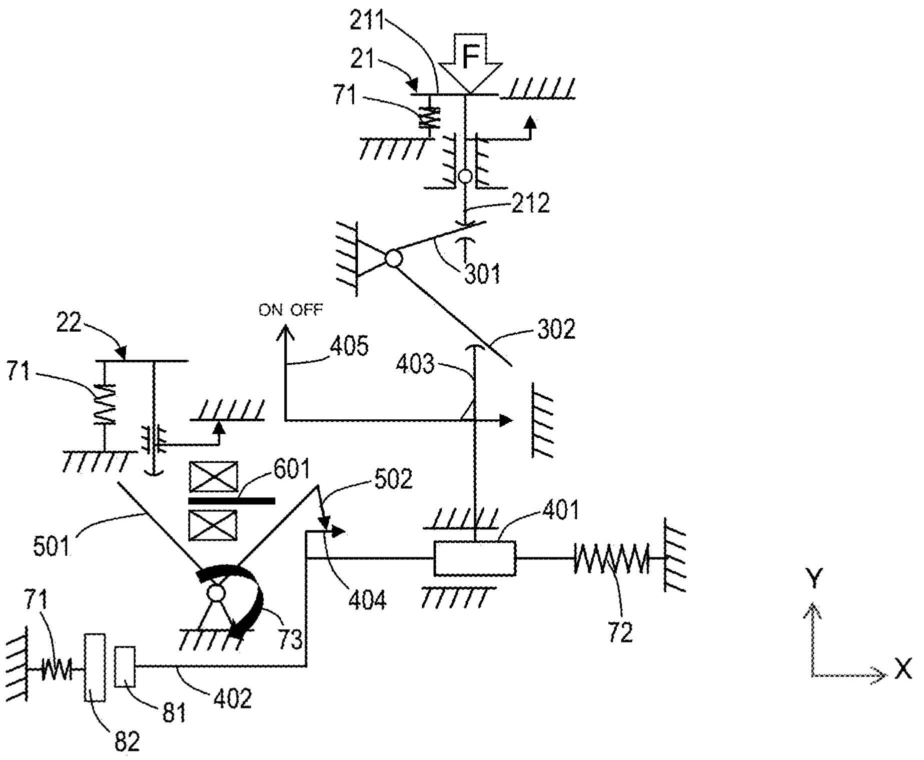
FIGS. 5A to 5D illustrate a manual closing process of the press type mechanical switching mechanism according to an embodiment of the present disclosure.

As shown in FIG. 5A, the press type mechanical switching mechanism is in the process of being closed, that is, in the process of being switched from the opened state to the closed state. The first pressing member 21 moves in a negative direction of Y under the action of an external force F. The first pressing member 21 transmits a driving force to the transmission member 30 through a contact point between the rotating part 212 and the first transmission part 301, so that the transmission member 30 rotates in the clockwise direction with respect to the rack 10. The transmission member 30 transmits a driving force to the contact support member 40 through a contact point between the second transmission part 302 and the third transmission part 403, so that the contact support member 40 moves in a negative direction of X, thereby driving the first mechanical contact 81 to move towards the second mechanical contact 82. The contact support member 40 drives the position limiting member 50 to rotate in the counterclockwise direction through a first contact point between the first mating part 404 and the second mating part 502, and the position limiting member 50 has not yet locked the contact support member 40 at this time.

Figure 5B:
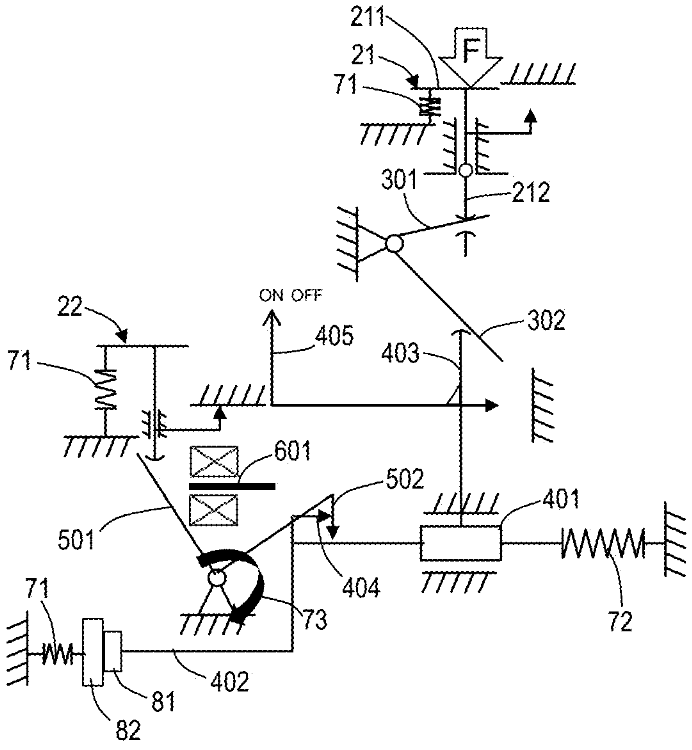

As shown in FIG. 5B, the first pressing member 21 continues to be pressed in the negative direction of Y, so that the contact support member 40 further moves in the negative direction of X until the first contact point between the first mating part 404 and the second mating part 502 is separated. At this time, the position limiting member 50 rotates in the clockwise direction under the action of the torsional spring 73, buckles the contact supporting member 40 to form a second contact point between the first mating part 404 and the second mating part 502. The first mating part 404 and the second mating part 502 limit each other to achieve the locking of the position limiting member 50 on the contact support member 40, so that the first mechanical contact 81 and the second mechanical contact 82 are held in the on state.

Figure 5C:
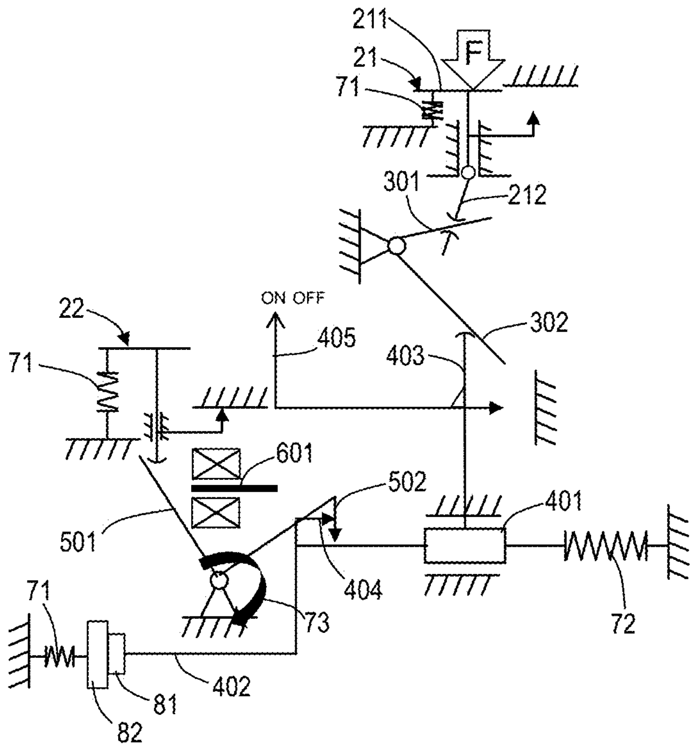

As shown in FIG. 5C, the first pressing member 21 continues to be pressed in the negative direction of Y, the rotating part 212 is no longer limited by the rack 10, and thus the rotating part 212 rotates with respect to the first pressing part 211 and is bent.

Figure 5D:
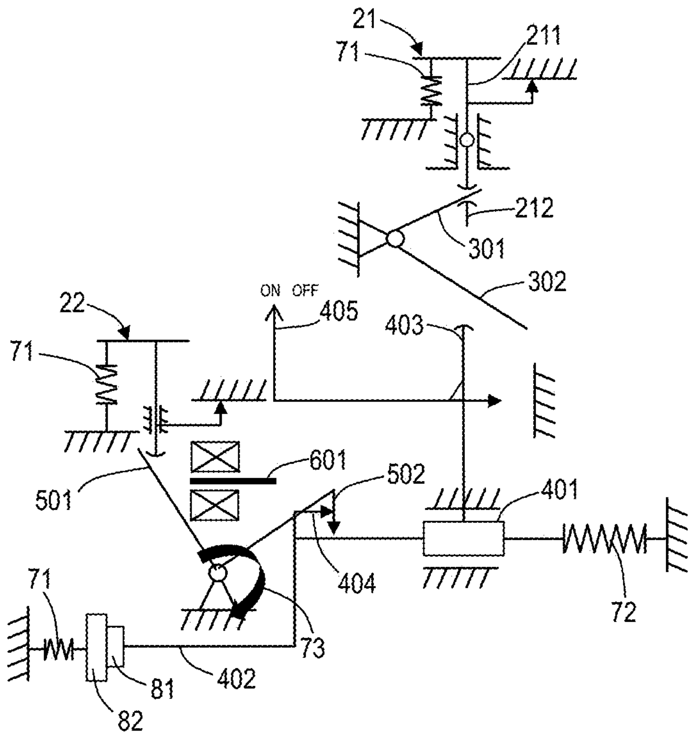

As shown in FIG. 5D, the external force F is removed, and the first pressing member 21 returns to the initial position when no external force F is applied under the action of the compression spring 71.

Through the manual closing process shown in FIGS. 5A to 5D, the mechanical switching mechanism can be reliably switched from the opened state to the closed state through simple operation.

FIGS. 6A to 6D illustrate a manual opening process of the press type mechanical switching mechanism according to an embodiment of the present disclosure.

Figure 6A:
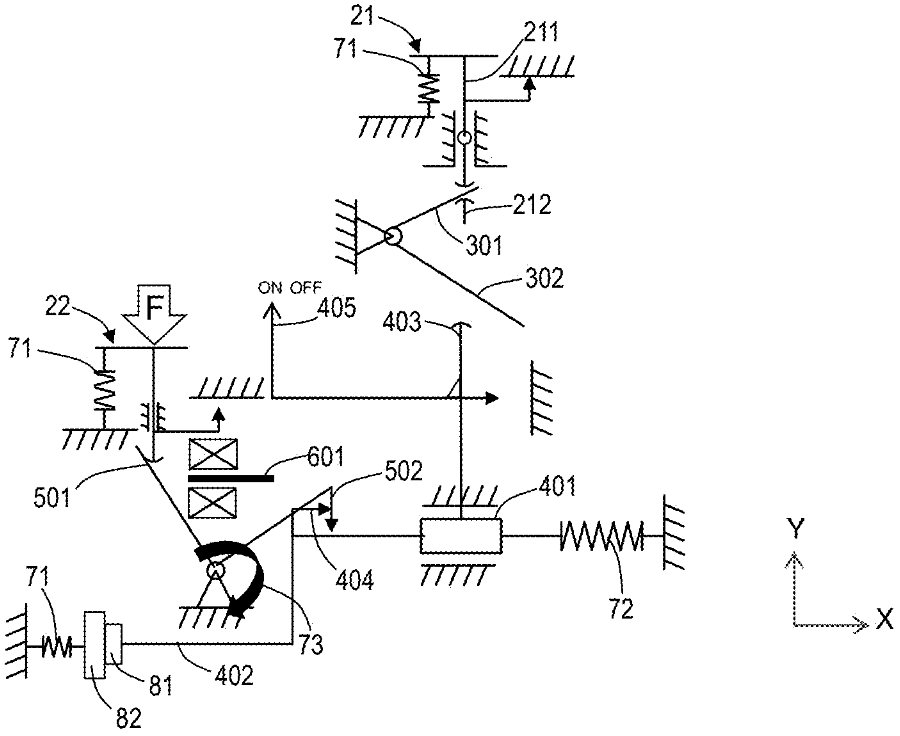
FIGS. 6A to 6D illustrate a manual opening process of the press type mechanical switching mechanism according to an embodiment of the present disclosure.

An shown in FIG. 6A, in a case that the mechanical switching mechanism is in the closed state, an external force F is applied to the second pressing member 22 in the negative direction of Y. The second pressing member 22 moves in the negative direction of Y, and drives the position limiting member 50 to rotate in the counterclockwise direction through the contact point between the second pressing member 22 and the fourth transmission part 501, so that the first mating part 404 and the second mating part 502 start to be separated from each other from the second contact point.

Figure 6B:
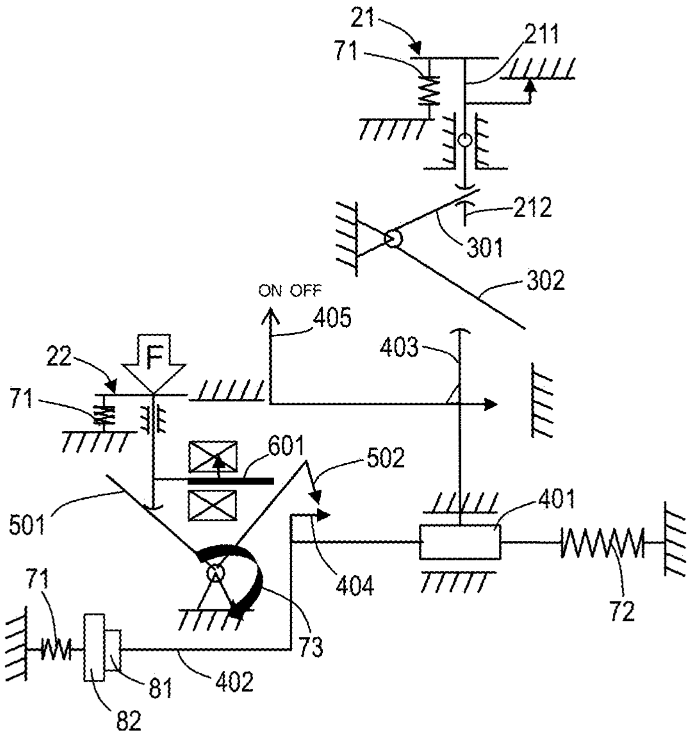

An shown in FIG. 6B, the second pressing member 22 continues to be pressed in the negative direction of Y, so that the separation between the first mating part 404 and the second mating part 502 from the second contact point is completed. At this time, the position limiting member 50 unlocks the contact support member 40.

Figure 6C:
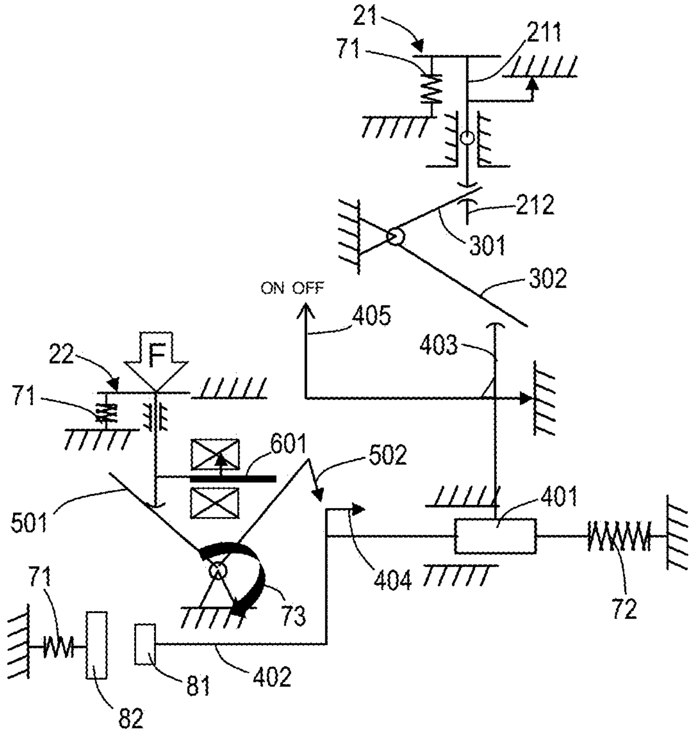

An shown in FIG. 6C, the contact support member 40 is subjected to a tensile force of the tension spring 72 in the X direction, therefore moving in a positive direction of X. The contact support member 40 may move in the positive direction of X to a position where the contact support member 40 is limited by the rack 10, so that the first mechanical contact 81 is separated from the second mechanical contact 82.

Figure 6D:
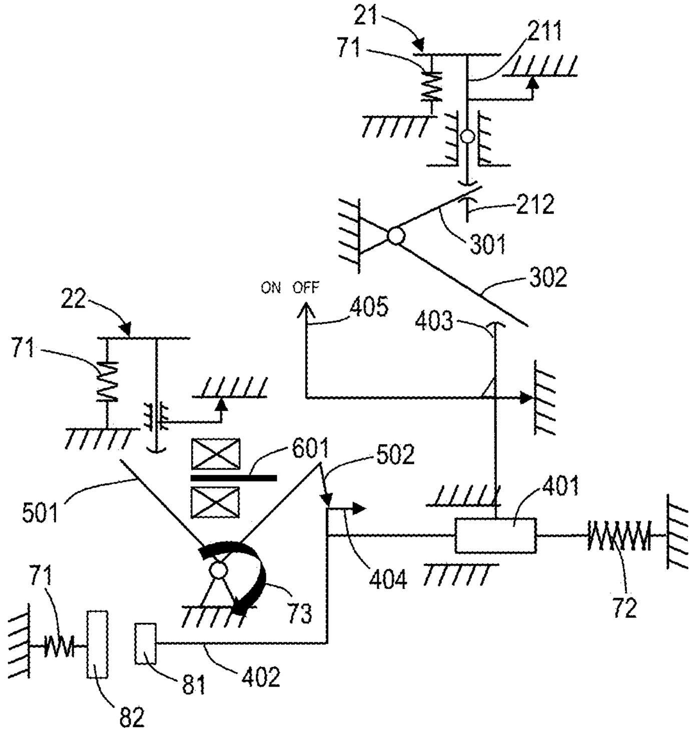

An shown in FIG. 6D, the external force F is removed, and the second pressing member 22 returns to the initial position when no external force F is applied under the action of the compression spring 71. The position limiting member 50 rotates in the clockwise direction under the action of the torsional spring 73, restoring to the first contact point between the first mating part 404 and the second mating part 502.

Through the manual opening process shown in FIGS. 6A to 6D, the mechanical switching mechanism can be reliably switched from the closed state to the opened state through the simple operation.

Figure 7:
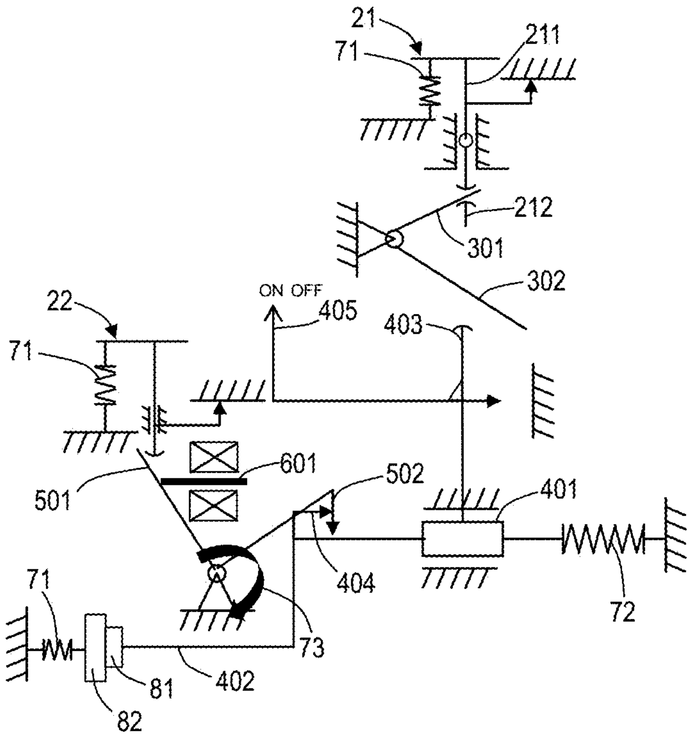
FIG. 7 illustrates an electric opening process of the press type mechanical switching mechanism according to an embodiment of the present disclosure.

FIG. 7 illustrates an electric opening process of the press type mechanical switching mechanism according to an embodiment of the present disclosure. As shown in FIG. 7, in a case that the mechanical switching mechanism is in the closed state, the electromagnetic assembly 60 is triggered, so that the iron core 601 is pushed out and in contact with the position limiting member 50 at the contact point between the iron core 601 and the fourth transmission part 501. Under the thrust of the iron core 601, the position limiting member 50 will rotate in the counterclockwise direction, so that the position limiting member 50 is disengaged from the contact support member 40 from the second contact point, that is, a buckle latch between the position limiting member 50 and the contact support member 40 is disengaged. At this time, the contact support member 40 moves in the positive direction of X under the action of the tension spring 72, so that the first mechanical contact 81 is separated from the second mechanical contact 82. The contact support member 40 moves to the position where the contact support member 40 is limited by the rack 10, and a trigger instruction of the electromagnetic assembly 60 is removed, so that the iron core 601 is retracted, and the position limiting member 50 is also restored to the position where the position limiting member 50 has the first contact point with the contact support member 40 under the action of the torsional spring 73.

As described above, in a case that the press type mechanical switching mechanism is in the closed state and the first pressing member 21 is kept pressed down, by powering the electromagnetic assembly 60, the electromagnetic assembly 60 can also drive the position limiting member 50 to move to unlock the contact support member 40, so that the first mechanical contact 81 is separated from the second mechanical contact 82, achieving the free tripping of the solid-state circuit breaker. FIGS. 8A to 8E illustrate a free tripping process of the press type mechanical switching mechanism according to an embodiment of the present disclosure.

Figure 8A:
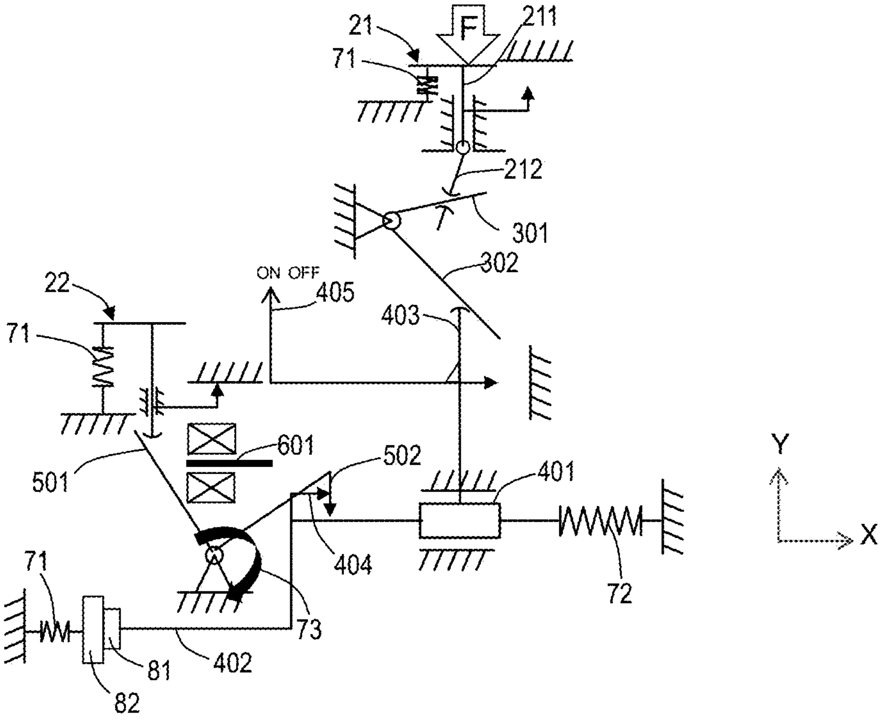
FIGS. 8A to 8E illustrate a free tripping process of the press type mechanical switching mechanism according to an embodiment of the present disclosure.

As shown in FIG. 8A, after the first pressing part 211 is pressed to a predefined position with respect to the rack 10, the rotating part 212 is no longer limited by the rack 10, and thus the rotating part 212 will rotate with respect to the first pressing part 211 and is bent.

Figure 8B:
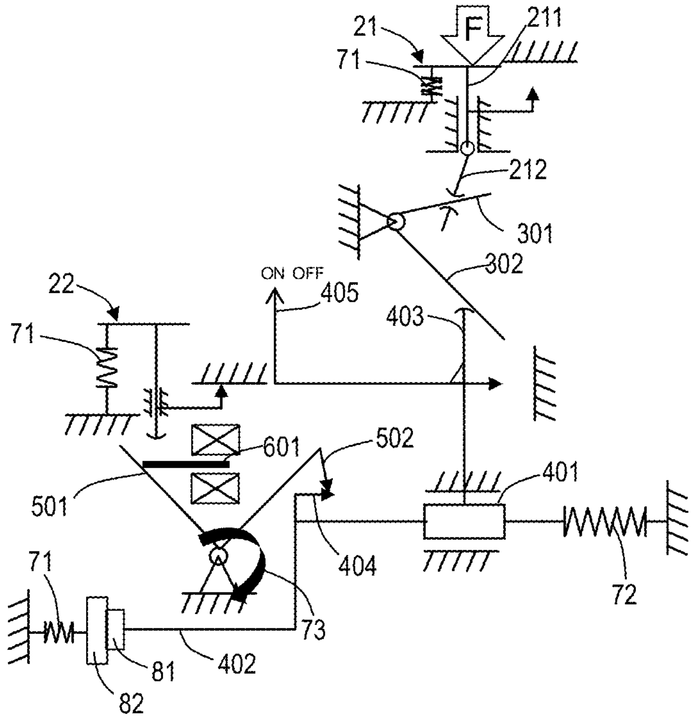

As shown in FIG. 8B, the electromagnetic assembly 60 is triggered, so that the iron core 601 is pushed out and in contact with the position limiting member 50 at the contact point between the iron core 601 and the fourth transmission part 501. Under the thrust of the iron core 601, the position limiting member 50 will rotate in the counterclockwise direction, so that the position limiting member 50 is disengaged from the contact support member 40 from the second contact point, that is, a buckle latch between the position limiting member 50 and the contact support member 40 is disengaged.

Figure 8C:
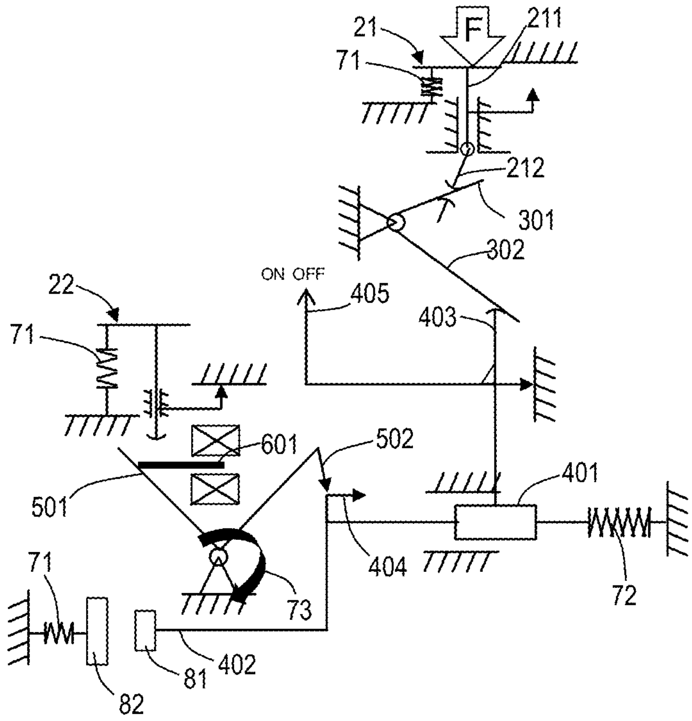

As shown in FIG. 8C, in a case that the position limiting member 50 unlocks the contact support member 40, the contact support member 40 moves in the positive direction of X under the action of the tension spring 72, so that the first mechanical contact 81 is separated from the second mechanical contact 82. The contact support member 40 moves to the position where the contact support member 40 is limited by the rack 10.

Figure 8D:
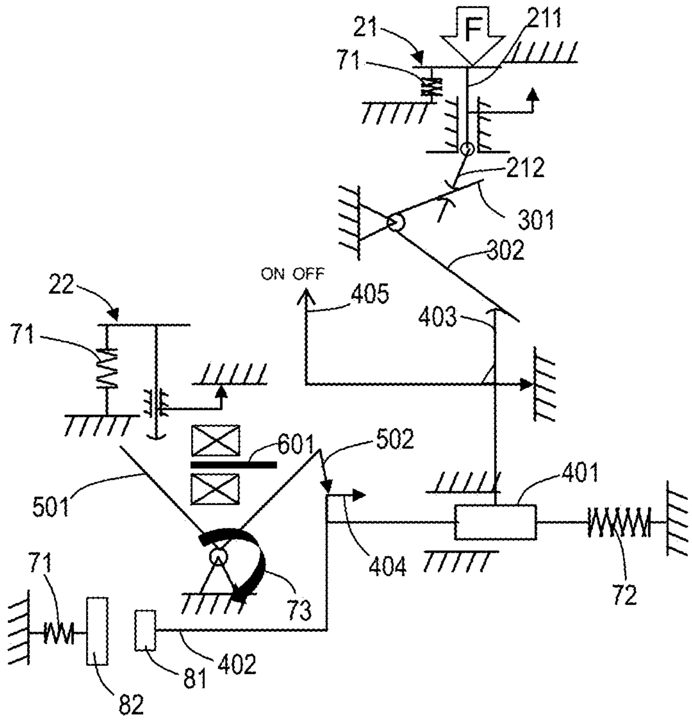

As shown in FIG. 8D, a trigger instruction of the electromagnetic assembly 60 is removed, so that the iron core 601 is retracted, and the position limiting member 50 is also restored to the position where the position limiting member 50 has the first contact point with the contact support member 40 under the action of the torsional spring 73.

Figure 8E:
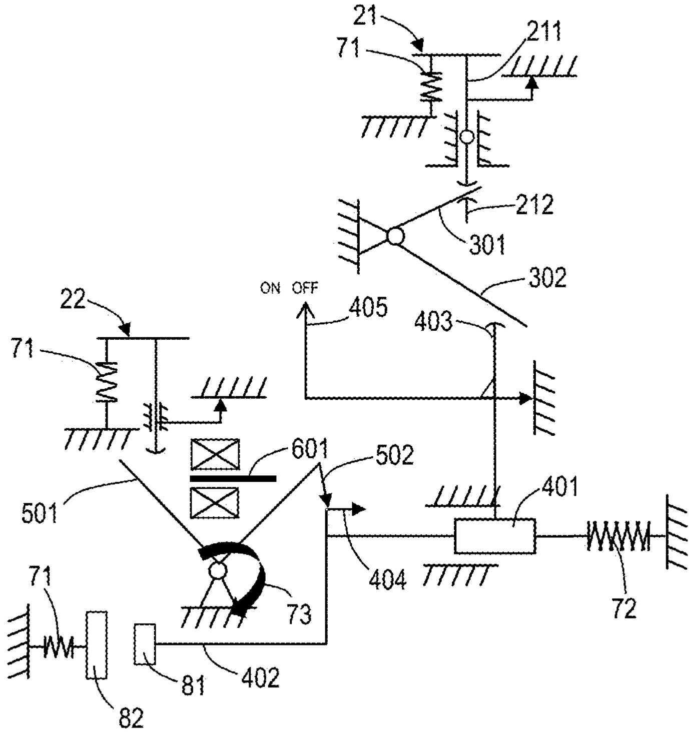

As shown in FIG. 8E, the external force F applied to the first pressing member 21 is removed, so that the first pressing member 21 is restored to the initial position. Thus, the free tripping process of the mechanical switching mechanism is completed.

Through the approaches as shown in FIGS. 8A to 8E, even when the press type mechanical switching mechanism is in the closed state and the first pressing member 21 is kept pressed down, the free tripping can be achieved, further improving the safety performance of the circuit breaker.

Embodiments of the present disclosure also provide a circuit breaker, comprising any of the press type mechanical switching mechanism described above. As an example, the circuit breaker may comprise a solid-state circuit breaker. It should be understood that the press type mechanical switching mechanism may also be applied to other types of circuit breakers, embodiments of the present disclosure are not limited in this respect.

Various embodiments of the present disclosure have been described above, which are exemplary, not exhaustive, and are not limited to the disclosed embodiments. Without deviating from the scope and spirit of the various embodiments explained, many modifications and changes are apparent for those skilled in the art. The selection of terms used herein is intended to best explain the principles, practical applications, or technological improvements in the market of each embodiment, or to enable those skilled in the art to understand the disclosed embodiments.

What is claimed is:

1. A press type mechanical switching mechanism, comprising:

a first mechanical contact and a second mechanical contact capable of switching between an on state and an off state;

a first pressing member configured to switch the first mechanical contact and the second mechanical contact from the off state to the on state in a case that the first mechanical contact and the second mechanical contact are in the off state and the first pressing member is pressed down;

a second pressing member configured to switch the first mechanical contact and the second mechanical contact from the on state to the off state in a case that the first mechanical contact and the second mechanical contact are in the on state and the second pressing member is pressed down; and an electromagnetic assembly configured to switch the first mechanical contact and the second mechanical contact from the on state to the off state in a case that the first mechanical contact and the second mechanical contact are in the on state and the first pressing member is not pressed down and in a case that the first mechanical contact and the second mechanical contact are in the on state and the first pressing member is kept pressed down.

2. The press type mechanical switching mechanism of claim 1, further comprising:

a contact support member supporting the first mechanical contact;

a transmission member configured to rotate under driving of the first pressing member in a case that the first pressing member is pressed down and drive the contact support member to move, such that the first mechanical contact moves towards the second mechanical contact in a first predefined direction; and a position limiting member configured to lock the contact support member in a case that the first mechanical contact and the second mechanical contact are in the on state, and unlock the contact support member in a case that the second pressing member is pressed down or the electromagnetic assembly is triggered.

3. The press type mechanical switching mechanism of claim 2, wherein the first pressing member comprises a first pressing part and a rotating part rotatably connected to the first pressing part, wherein before the first pressing part is pressed to a first predefined position with respect to the rack, the rotating part is capable of moving together with the first pressing part in a pressing direction with respect to the rack to drive the transmission member to rotate, and after the first pressing part is pressed to the first predefined position with respect to the rack, the rotating part is capable of rotating with respect to the first pressing part and stop driving the transmission member to rotate.

4. The press type mechanical switching mechanism of claim 3, wherein the first pressing part is connected to the rack via an elastic member and is limited by the rack in an initial position without being pressed.

5. The press type mechanical switching mechanism of claim 2, wherein the transmission member comprises a first transmission part and a second transmission part, the first transmission part is actively connected to the first pressing member and capable of rotating under driving of the first pressing member, the second transmission part is configured to drive the contact support member to move under driving of the first transmission part such that the first mechanical contact moves towards the second mechanical contact in the first predefined direction.

6. The press type mechanical switching mechanism of claim 2, wherein the contact support member comprises:

a sliding member capable of moving with respect to the rack in the first predefined direction in a case that the first pressing member is pressed down;

a support part connected to the sliding member and supporting the first mechanical contact;

a third transmission part connected to the sliding member and capable of being driven by the transmission member such that the sliding member moves in the first predefined direction with respect to the rack; and a first mating part connected to the sliding member and capable of being locked by the position limiting member.

7. The press type mechanical switching mechanism of claim 6, wherein the sliding member is connected to the rack via an elastic member and capable of pulling the sliding member towards a direction opposite to the first predefined direction in a case that the position limiting member unlocks the contact support member.

8. The press type mechanical switching mechanism of claim 6, wherein the contact support member further comprises:

an indicating part connected to the sliding member and capable of indicating a connection state between the first mechanical contact and the second mechanical contact.

9. The press type mechanical switching mechanism of claim 2, wherein the position limiting member is rotatably connected to the rack and comprises a fourth transmission part and a second mating part, the fourth transmission part is capable of being driven by the second pressing member or the electromagnetic assembly to cause the position limiting member to rotate in a second predefined direction with respect to the rack, wherein the second mating part locks the contact support member before the position limiting member rotates to a second predefined position in the second predefined direction with respect to the rack, and the second mating part unlocks the contact support member after the position limiting member rotates to the second predefined position in the second predefined direction with respect to the rack.

10. The press type mechanical switching mechanism of claim 9, wherein the position limiting member is provided with a torsional spring, and in a case that the second pressing member is released or the electromagnetic assembly is not triggered, the torsional spring drives the position limiting member to rotate in a direction opposite to the second predefined direction.

11. The press type mechanical switching mechanism of claim 2, wherein the electromagnetic assembly comprises an iron core, wherein in a case that the electromagnetic assembly is triggered, the iron core extends out and is capable of driving the position limiting member to unlock the contact support member.

12. The press type mechanical switching mechanism of claim 1, wherein the second pressing member is connected to the rack via an elastic member and is limited in an initial position by the rack without being pressed.

13. The press type mechanical switching mechanism of claim 1, wherein the second mechanical contact is connected to the rack via an elastic member.

14. The press type mechanical switching mechanism of claim 2, wherein the first mechanical contact is connected to the contact support member via an elastic member.

15. A circuit breaker comprising a press type mechanical switching mechanism of claim 1.

* * * * *